United States Patent
Leppänen et al.

(10) Patent No.: US 9,386,434 B2
(45) Date of Patent: Jul. 5, 2016

(54) METHOD AND APPARATUS FOR SYNCHRONIZATION OF DEVICES

(75) Inventors: Tapani Antero Leppänen, Tampere (FI); Timo Tapani Aaltonen, Tampere (FI)

(73) Assignee: Nokia Technologies Oy, Espoo (FI)

( * ) Notice: Subject to any disclaimer, the term of this patent is extended or adjusted under 35 U.S.C. 154(b) by 443 days.

(21) Appl. No.: 13/363,034

(22) Filed: Jan. 31, 2012

(65) Prior Publication Data

US 2013/0198276 A1 Aug. 1, 2013

(51) Int. Cl.
*G06F 15/16* (2006.01)
*H04W 4/20* (2009.01)
*H04L 29/08* (2006.01)

(52) U.S. Cl.
CPC ............. *H04W 4/206* (2013.01); *H04L 67/10* (2013.01)

(58) Field of Classification Search
CPC ........ H04L 69/28; H04L 7/0008; H04L 7/041
USPC .......................................................... 709/204
See application file for complete search history.

(56) References Cited

U.S. PATENT DOCUMENTS

| | | | |
|---|---|---|---|
| 7,545,320 B2 * | 6/2009 | Oster | 342/357.42 |
| 2001/0056501 A1 | 12/2001 | Law et al. | |
| 2003/0130040 A1 * | 7/2003 | Dripps | 463/42 |
| 2006/0161621 A1 * | 7/2006 | Rosenberg | 709/204 |
| 2007/0249291 A1 | 10/2007 | Nanda et al. | |
| 2008/0148360 A1 | 6/2008 | Karstens | |
| 2009/0182813 A1 | 7/2009 | McCartie et al. | |
| 2009/0222142 A1 * | 9/2009 | Kao et al. | 700/291 |
| 2010/0161723 A1 | 6/2010 | Bryce et al. | |
| 2011/0187652 A1 | 8/2011 | Huibers | |
| 2011/0191823 A1 | 8/2011 | Huibers | |
| 2012/0263165 A1 | 10/2012 | Zakrzewski et al. | |

OTHER PUBLICATIONS

Kirovski, D. et al., *The Martini Synch: Using Accelerometers for Device Pairing*, Microsoft Research, Jun. 2009, pp. 1-16.
Mayrhofer, R. et al., *Shake Well Before Use: Intuitive and Secure Pairing of Mobile Devices*, IEEE Transactions on Mobile Computing, vol. 8, No. 6, Jun. 2009, 792-806.
Mills, D. et al., *Network Time Protocol Version 4: Protocol and Algorithms Specification*, RFC 5905, Internet Engineering Task Force (IETF), ISSN: 2070-1721, Jun. 2010, pp. 1-92.
Gayraud, R. et al., *Network Time Protocol (NTP) Server Option for DHCPv6*, IETF, RFC 5908 (Jun. 2010) 9 pages.

(Continued)

*Primary Examiner* — Hua Fan
(74) *Attorney, Agent, or Firm* — Alston & Bird LLP (57) ABSTRACT

A method, apparatus, and computer program product are provided to enable the provision of a mechanism by which a device participating in a collaborative application may synchronize with other participating devices. A method may include providing for operation of a collaboration application, receiving a signal from a sensor, establishing a reference time in response to receiving the signal from the sensor, and synchronizing the collaboration application using the reference time. The sensor may include an accelerometer and the signal may include a sampling of information from the sensor. The sampling may be conducted during a pre-defined time interval or possibly until a bump is detected. Establishing the reference time may include detecting a maximum value of the signal and/or detecting the signal exceeding a pre-defined threshold. Establishing the reference time may not require wireless communication.

20 Claims, 7 Drawing Sheets

(56) References Cited

OTHER PUBLICATIONS

Gerstung, H. et al., *Definitions of Managed Objects for Network Time Protocol Version 4 (NTPv4)*, IETF, FRC 5907 (Jun. 2010) 25 pages.

Haberman, B. et al., *Network Time Protocol Version 4: Autokey Specification*, IETF, RFC 5906 (Jun. 2010) 55 pages.

Mills, D. et al., *Network Time Protocol Version 4: Protocol and Algorithms Specification*, IETF, RFC 5905 (Jun. 2010) 103 pages.

IEEE1588 Frequently Asked Questions (FAQs), Intel (Dec. 2011) 7 pages.

Using Hardware Timestamps with PF_RING, [online] [retrieved Jul. 29, 2014]. <URL: http://www.ntop/org/pf_ring/hardware-timestamps-with-pf_ring > (dated Feb. 11, 2011) 2 pages.

SyncEvolution—The Missing Link, Linux 2.6.30: Hardware Assisted Time Stamping of Network Packets, [online] [retrieved Jul. 29, 2014]. <URL: http://www.estamos.de/blog/2009/07/01/linux-2-6-30-hardware-assisted-time-stamping- of-network-packets/comments-page-1>. (dated Jul. 1, 2009) 10 pages.

Precision Time Protocol (PTP), IEEE 1588, [online] [retrieved Jul. 30, 2014]. <URL: http://en.wikipedia.org/w/index.php?title=Precision_Time_Protocol&oldid=472312248>. (dated Jan. 20, 2012).7 pages.

Office Action for U.S. Appl. No. 13/749,013, dated Jan. 28, 2015.

Office Action for U.S. Appl. No. 13/749,013, dated Aug. 7, 2015.

Office Action for U.S. Appl. No. 13/749,013 dated Feb. 1, 2016.

* cited by examiner

METHOD AND APPARATUS FOR SYNCHRONIZATION OF DEVICES

TECHNOLOGICAL FIELD

Some example embodiments of the present invention relate generally to collaboration applications and, more particularly, relate to a method and apparatus for providing a mechanism by which devices may be synchronized with one another for operation of collaboration applications.

BACKGROUND

Advancements in mobile device technology have developed mobile devices, such as cellular telephones and portable digital assistants (PDAs) that have increased capabilities and provide a user with greater access and control of information. Users may have numerous applications which may communicate and collaborate with other user devices to enhance the user experience and to provide greater functionality than that of a device operating independently.

Collaborative applications may provide a benefit to users through expanded functionality and enhanced capabilities using multiple devices to accomplish tasks and functions; however, these applications typically require time synchronization with a time server in order to facilitate efficient and proper collaboration. Network latency and communication issues may preclude collaborative applications from properly synchronizing devices leading to a lower quality collaborative experience or loss of functionality of the collaboration.

BRIEF SUMMARY

A method, apparatus and computer program product are provided to enable the provision of a mechanism by which a device participating in a collaborative application may synchronize with other participating devices. In some cases, for example, a device may initiate a collaborative application and be bumped against another collaborating device to synchronize the collaboration application between the devices.

An example embodiment may provide a method for providing for operation of a collaboration application, receiving a signal from a sensor, establishing a reference time in response to receiving the signal from the sensor, and synchronizing the collaboration application using the reference time. The sensor may include an accelerometer and the signal may include a sampling of information from the sensor. The sampling may be conducted during a pre-defined time interval or possibly until a bump is detected. Establishing the reference time may include detecting a maximum value of the signal and/or detecting the signal exceeding a pre-defined threshold. Establishing the reference time may not require wireless communication.

Another example embodiment may provide an apparatus including at least one processor and at least one memory including computer program code, the at least one memory and the computer program code configured to, with the processor, cause the apparatus to at least provide for operation of a collaboration application, receive a signal from a sensor, establish a reference time in response to receiving the signal from the sensor, and synchronize the collaboration application using the reference time. The sensor may include an accelerometer. The signal may include a sampling of information from the sensor and the sampling may be conducted during a time interval. Establishing the reference time may include detecting a maximum value of the signal and/or detecting the signal exceeding a pre-defined threshold. Establishing the reference time may not require wireless communication.

Another example embodiment may provide a computer program product comprising at least one non-transitory computer-readable storage medium having computer-executable program code instructions stored therein, the computer-executable program code instructions comprising program code instructions to provide for operation of a collaboration application, program code instructions to receive a signal from a sensor, program code instructions to establish a reference time in response to receiving the signal from the sensor, and program code instructions to synchronize the collaboration application using the reference time. The sensor may be an accelerometer and the signal may include a sampling of information from the sensor. The sampling may be conducted during a time interval. The program code instructions for establishing the reference time may include program code instructions for detecting a maximum value of the signal and/or program code instructions for detecting the signal exceeding a pre-defined threshold.

Another example embodiment may provide an apparatus including means for providing for operation of a collaboration application, means for receiving a signal from a sensor, means for establishing a reference time in response to receiving the signal from the sensor, and means for synchronizing the collaboration application using the reference time. The sensor may include an accelerometer. The signal may include a sampling of information from the sensor and the sampling may be conducted during a time interval. The means for establishing the reference time may include means for detecting a maximum value of the signal and/or means for detecting the signal exceeding a pre-defined threshold. The means for establishing the reference time may not require wireless communication.

BRIEF DESCRIPTION OF THE SEVERAL VIEWS OF THE DRAWING(S)

Having thus described some embodiments of the invention in general terms, reference will now be made to the accompanying drawings, which are not necessarily drawn to scale, and wherein:

DETAILED DESCRIPTION

Some embodiments of the present invention will now be described more fully hereinafter with reference to the accompanying drawings, in which some, but not all embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information" and similar terms may be used interchangeably to refer to data capable of being transmitted, received and/or stored in accordance with some embodiments of the present invention. Thus, use of any such terms should not be taken to limit the spirit and scope of embodiments of the present invention.

Additionally, as used herein, the term 'circuitry' refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device, and/or other computing device.

As defined herein a "computer-readable storage medium," which refers to a non-transitory, physical storage medium (e.g., volatile or non-volatile memory device), can be differentiated from a "computer-readable transmission medium," which refers to an electromagnetic signal.

Some embodiments of the present invention may relate to a provision of a mechanism by which a device participating in a collaborative application may synchronize with other participating devices. Collaborative applications may require that participating devices be synchronized to properly collaborate within the application. Multi-device collaboration applications may share data, distribute computational requirements, receive or transmit information simultaneously, or otherwise function together, collaboratively, to expand the functionality of multiple devices beyond that of a single device. Therefore, it may be desirable to synchronize the participating devices for the collaboration application.

Figure 1:
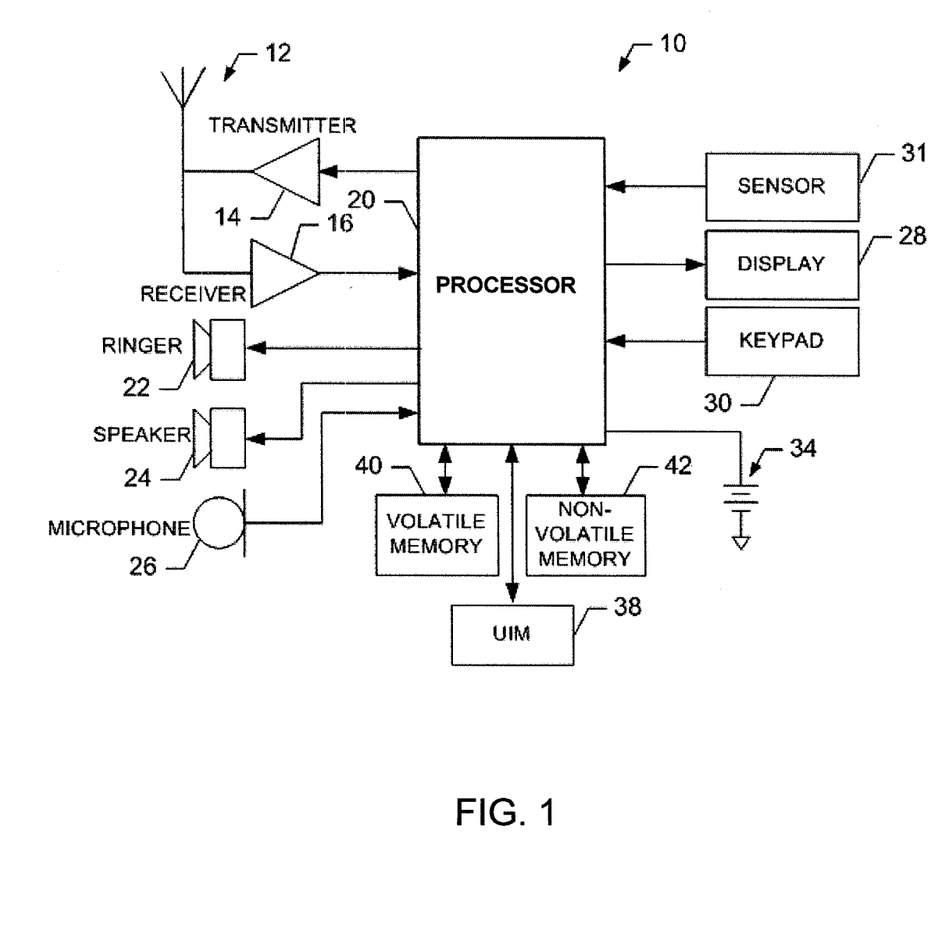
FIG. 1 is a schematic block diagram of a mobile terminal according to an example embodiment of the present invention.

FIG. 1 illustrates a block diagram of a mobile terminal 10 that would benefit from an embodiment of the present invention. It should be understood, however, that the mobile terminal 10 as illustrated and hereinafter described is merely illustrative of one type of device that may benefit from embodiments of the present invention and, therefore, should not be taken to limit the scope of embodiments of the present invention. As such, although numerous types of mobile terminals, such as portable digital assistants (PDAs), mobile telephones, pagers, mobile televisions, gaming devices, laptop computers, cameras, tablet computers, touch surfaces, wearable devices, video recorders, audio/video players, radios, electronic books, positioning devices (e.g., global positioning system (GPS) devices), or any combination of the aforementioned, and other types of voice and text communications systems, may readily employ embodiments of the present invention, while other devices including fixed (non-mobile) electronic devices may also employ some example embodiments.

The mobile terminal 10 may include an antenna 12 (or multiple antennas) in operable communication with a transmitter 14 and a receiver 16. The mobile terminal 10 may further include an apparatus, such as a processor 20 or other processing device (e.g., processor 70 of FIG. 2), which controls the provision of signals to and the receipt of signals from the transmitter 14 and receiver 16, respectively. The signals may include signaling information in accordance with the air interface standard of the applicable cellular system, and also user speech, received data and/or user generated data. In this regard, the mobile terminal 10 is capable of operating with one or more air interface standards, communication protocols, modulation types, and access types. By way of illustration, the mobile terminal 10 is capable of operating in accordance with any of a number of first, second, third and/or fourth-generation communication protocols or the like. For example, the mobile terminal 10 may be capable of operating in accordance with second-generation (2G) wireless communication protocols IS-136 (time division multiple access (TDMA)), GSM (global system for mobile communication), and IS-95 (code division multiple access (CDMA)), or with third-generation (3G) wireless communication protocols, such as Universal Mobile Telecommunications System (UMTS), CDMA2000, wideband CDMA (WCDMA) and time division-synchronous CDMA (TD-SCDMA), with 3.9G wireless communication protocol such as evolved UMTS Terrestrial Radio Access Network (E-UTRAN), with fourth-generation (4G) wireless communication protocols (e.g., Long Term Evolution (LTE) or LTE-Advanced (LTE-A) or the like. As an alternative (or additionally), the mobile terminal 10 may be capable of operating in accordance with non-cellular communication mechanisms. For example, the mobile terminal 10 may be capable of communication in a wireless local area network (WLAN) or other communication networks.

In some embodiments, the processor 20 may include circuitry desirable for implementing audio and logic functions of the mobile terminal 10. For example, the processor 20 may be comprised of a digital signal processor device, a microprocessor device, and various analog to digital converters, digital to analog converters, and other support circuits. Control and signal processing functions of the mobile terminal 10 are allocated between these devices according to their respective capabilities. The processor 20 thus may also include the functionality to convolutionally encode and interleave message and data prior to modulation and transmission. The processor 20 may additionally include an internal voice coder, and may include an internal data modem. Further, the processor 20 may include functionality to operate one or more software programs, which may be stored in memory. For example, the processor 20 may be capable of operating a connectivity program, such as a conventional Web browser. The connectivity program may then allow the mobile terminal 10 to transmit and receive Web content, such as location-based content and/or other web page content, according to a Wireless Application Protocol (WAP), Hypertext Transfer Protocol (HTTP) and/or the like, for example.

The mobile terminal 10 may also comprise a user interface including an output device such as a conventional earphone or speaker 24, a ringer 22, a microphone 26, a display 28, and a user input interface, all of which are coupled to the processor 20. The user input interface, which allows the mobile terminal 10 to receive data, may include any of a number of devices allowing the mobile terminal 10 to receive data, such as a keypad 30, a touch display (display 28 providing an example of such a touch display) or other input device. In embodiments including the keypad 30, the keypad 30 may include the conventional numeric (0-9) and related keys (#, *), and other hard and soft keys used for operating the mobile terminal 10. Alternatively or additionally, the keypad 30 may include a conventional QWERTY keypad arrangement. The keypad 30 may also include various soft keys with associated functions. In addition, or alternatively, the mobile terminal 10 may include an interface device such as a joystick or other user input interface. Some embodiments employing a touch display may omit the keypad 30 and any or all of the speaker 24, ringer 22, and microphone 26 entirely.

Additional input to the processor 20 may be provided by a sensor 31. The sensor 31 may include one or more of an accelerometer, a motion sensor, temperature sensor, light sensor, or the like. Forms of input that may be received by the sensor may include physical motion of the mobile terminal 10, whether or not the mobile terminal 10 is in a dark environment (e.g., a pocket) or in daylight, whether the mobile terminal is being held by a user or not (e.g., through temperature sensing of a hand) or the physical orientation of the mobile terminal 10 as will be further described below. The mobile terminal 10 further includes a battery 34, such as a vibrating battery pack, for powering various circuits that are required to operate the mobile terminal 10, as well as optionally providing mechanical vibration as a detectable output.

The mobile terminal 10 may further include a user identity module (UIM) 38. The UIM 38 is typically a memory device having a processor built in. The UIM 38 may include, for example, a subscriber identity module (SIM), a universal integrated circuit card (UICC), a universal subscriber identity module (USIM), a removable user identity module (R-UIM), etc. The UIM 38 typically stores information elements related to a mobile subscriber. In addition to the UIM 38, the mobile terminal 10 may be equipped with memory. For example, the mobile terminal 10 may include volatile memory 40, such as volatile Random Access Memory (RAM) including a cache area for the temporary storage of data. The mobile terminal 10 may also include other non-volatile memory 42, which may be embedded and/or may be removable. The memories may store any of a number of pieces of information, and data, used by the mobile terminal 10 to implement the functions of the mobile terminal 10.

In some embodiments, the mobile terminal 10 may also include a camera or other media capturing element (not shown) in order to capture images or video of objects, people and places proximate to the user of the mobile terminal 10. However, the mobile terminal 10 (or even some other fixed terminal) may also practice example embodiments in connection with images or video content (among other types of content) that are produced or generated elsewhere, but are available for consumption at the mobile terminal 10 (or fixed terminal).

An example embodiment of the invention will now be described with reference to FIG. 2, in which certain elements of an apparatus 50 for providing a mechanism by which a device may be synchronized with other devices for a collaboration application. The apparatus 50 of FIG. 2 may be employed, for example, in conjunction with the mobile terminal 10 of FIG. 1. The user interface 72 of FIG. 2 may include one or more of the display 28 and keypad 30 of the mobile terminal of FIG. 1. The apparatus may further include one or more sensors 84 such as sensor 31 of FIG. 1. The processor 70 of FIG. 2 may be embodied in the processor 20 of FIG. 1 and the communications interface 72 may include the transmitter 14, receiver 16, and antenna 12 of the mobile terminal 10. However, it should be noted that the apparatus 50 of FIG. 2, may also be employed in connection with a variety of other devices, both mobile and fixed, and therefore, embodiments of the present invention should not be limited to application on devices such as the mobile terminal 10 of FIG. 1.

Figure 2:
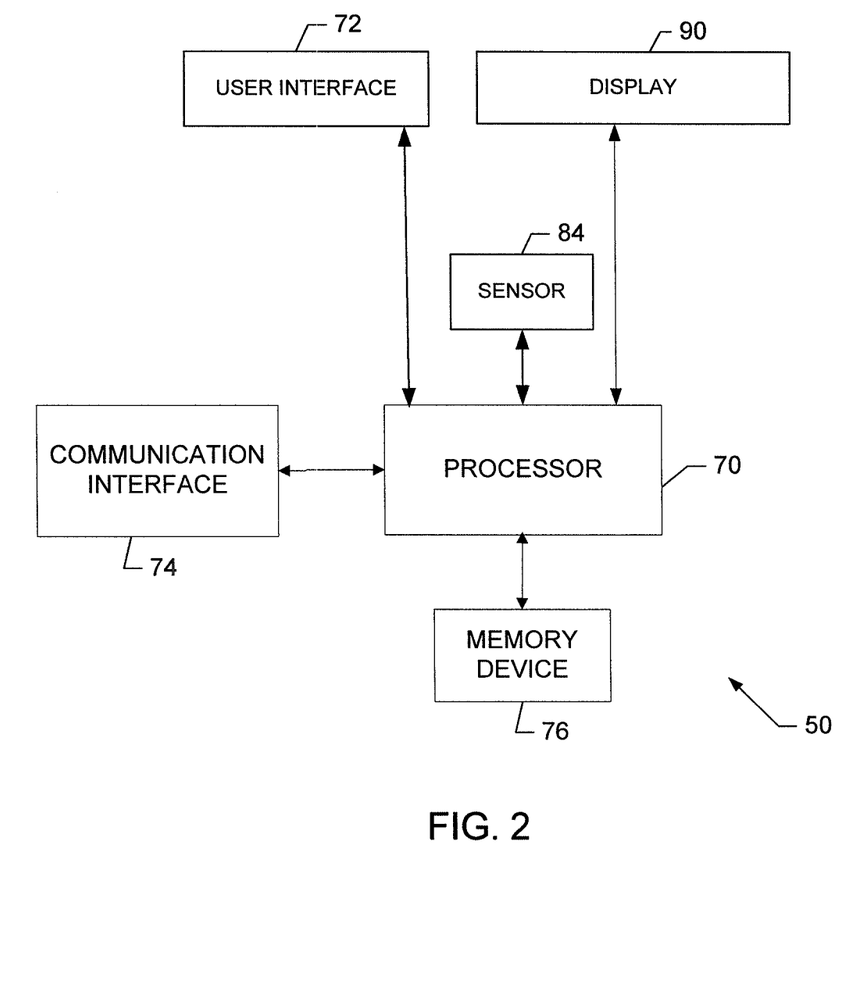
FIG. 2 is a schematic block diagram of an apparatus for providing a mechanism by which devices may be synchronized with one another for operation of collaboration applications according to an example embodiment of the present invention.

It should also be noted that while FIG. 2 illustrates one example of a configuration of an apparatus for providing a mechanism by which a device may be synchronized with other devices for a collaboration application, numerous other configurations may also be used to implement embodiments of the present invention. As such, in some embodiments, although devices or elements are shown as being in communication with each other, hereinafter such devices or elements should be considered to be capable of being embodied within the same device or element and thus, devices or elements shown in communication should be understood to alternatively be portions of the same device or element.

Referring again to FIG. 2, the apparatus 50 for providing a mechanism by which a device may be synchronized with other devices for a collaboration application is provided and may include or otherwise be in communication with a processor 70, a user interface 72, a communication interface 74 and a memory device 76. In some embodiments, the processor 70 (and/or co-processors or any other processing circuitry assisting or otherwise associated with the processor 70) may be in communication with the memory device 76 via a bus for passing information among components of the apparatus 50. The memory device 76 may include, for example, one or more volatile and/or non-volatile memories. In other words, for example, the memory device 76 may be an electronic storage device (e.g., a computer readable storage medium) comprising gates configured to store data (e.g., bits) that may be retrievable by a machine (e.g., a computing device like the processor 70). The memory device 76 may be configured to store information, data, applications, instructions or the like for enabling the apparatus to carry out various functions in accordance with an example embodiment of the present invention. For example, the memory device 76 could be configured to buffer input data for processing by the processor 70. Additionally or alternatively, the memory device 76 could be configured to store instructions for execution by the processor 70.

The apparatus 50 may, in some embodiments, be a mobile terminal (e.g., mobile terminal 10) or a computing device configured to employ an example embodiment of the present invention. However, in some embodiments, the apparatus 50 may be embodied as a chip or chip set. In other words, the apparatus 50 may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The apparatus 50 may therefore, in some cases, be configured to implement an embodiment of the present invention on a single chip or as a single "system on a chip." As such, in some cases, a chip or chipset may constitute means for performing one or more operations for providing the functionalities described herein.

The processor 70 may be embodied in a number of different ways. For example, the processor 70 may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor 70 may include one or more processing cores configured to perform independently. A multi-core processor may enable multiprocessing within a single physical package. Additionally or alternatively, the processor 70 may include one or more processors configured in tandem via the bus to enable independent execution of instructions, pipelining and/or multithreading.

In an example embodiment, the processor 70 may be configured to execute instructions stored in the memory device 76 or otherwise accessible to the processor 70. Alternatively or additionally, the processor 70 may be configured to execute hard coded functionality. As such, whether configured by hardware or software methods, or by a combination thereof, the processor 70 may represent an entity (e.g., physically embodied in circuitry) capable of performing operations according to an embodiment of the present invention while configured accordingly. Thus, for example, when the processor 70 is embodied as an ASIC, FPGA or the like, the processor 70 may be specifically configured hardware for conducting the operations described herein. Alternatively, as another example, when the processor 70 is embodied as an executor of software instructions, the instructions may specifically configure the processor 70 to perform the algorithms and/or operations described herein when the instructions are executed. However, in some cases, the processor 70 may be a processor of a specific device (e.g., a mobile terminal) adapted for employing an embodiment of the present invention by further configuration of the processor 70 by instructions for performing the algorithms and/or operations described herein. The processor 70 may include, among other things, a clock, an arithmetic logic unit (ALU) and logic gates configured to support operation of the processor 70.

Meanwhile, the communication interface 74 may be any means such as a device or circuitry embodied in either hardware or a combination of hardware and software that is configured to receive and/or transmit data from/to a network and/or any other device or module in communication with the apparatus 50. In this regard, the communication interface 74 may include, for example, an antenna (or multiple antennas) and supporting hardware and/or software for enabling communications with a wireless communication network. In some environments, the communication interface 74 may alternatively or also support wired communication. As such, for example, the communication interface 74 may include a communication modem and/or other hardware/software for supporting communication via cable, digital subscriber line (DSL), universal serial bus (USB) or other mechanisms.

The user interface 72 may be in communication with the processor 70 to receive an indication of a user input at the user interface 72 and/or to provide an audible, visual, mechanical or other output to the user. As such, the user interface 72 may include, for example, a keyboard, a mouse, a joystick, a display, a touch screen(s), touch areas, device surfaces capable of detecting objects hovering over the surface, soft keys, a microphone, a speaker, motion sensor, temperature sensor, accelerometer, or other input/output mechanisms. In this regard, for example, the processor 70 may comprise user interface circuitry configured to control at least some functions of one or more elements of the user interface, such as, for example, a speaker, ringer, microphone, display, and/or the like. The processor 70 and/or user interface circuitry comprising the processor 70 may be configured to control one or more functions of one or more elements of the user interface through computer program instructions (e.g., software and/or firmware) stored on a memory accessible to the processor 70 (e.g., memory device 76, and/or the like).

In an example embodiment, the apparatus 50 may include or otherwise be in communication with a display 90. In different example cases, the display 90 may be a two dimensional (2D) or three dimensional (3D) display. Additionally or alternatively, the display 90 may include multiple display surfaces. The user interface 72 may be in communication with the display 90 to receive indications of user inputs and to modify a response to such inputs based on corresponding user actions that may be inferred or otherwise determined responsive to the indications.

Example embodiments of devices according to the present invention may be capable of collaborating with other devices in collaboration applications which may benefit from multiple devices functioning together such as through the sharing of data, distribution of computational requirements, distribution of communication requirements, optimizing application function, or otherwise collaborating in a symbiotic or parasitic relationship with one another to perform the functions of the collaboration application.

Collaboration applications may include a wide variety of applications, such as computationally intensive applications which benefit from distributing their computational requirements among multiple devices to enhance processing capacity. Other applications may include game applications in which each participating device may serve as a player in the game. Further collaboration applications may include applications which gather data, such as a multi-media recording application which may allow participating devices to capture multi-channel sound and/or multi-position video for a stereophonic or stereoscopic multimedia experience. Many other embodiments of collaboration applications may similarly benefit from example embodiments of the present invention.

In order for devices to participate in a collaboration application, the devices may be in communication with one another (e.g., via communication interface 74) via near-field communication mechanisms (e.g., Bluetooth™) or other communication protocols as described above. The communication between participating devices may be direct, as in Bluetooth™ communication, or the communication may be through a network, such as a cellular network.

Collaboration applications may require or benefit from the clock synchronization of participating devices. When several devices are joined for the same task (e.g., capturing and processing sensor data, or producing audio/visual/haptic signals), they typically need to be synchronized to provide optimum functionality. Producing signals collaboratively may also require synchronization of the devices participating in the collaboration. Synchronization of devices may improve the efficiency and accuracy of data and information exchanged between synchronized devices. Synchronization of devices may include synchronizing a clock within each device with a clock of the other participating devices, such as a system clock (e.g., within processor 70) or mechanism by which a device keeps time for time-stamping data and information. Optionally, synchronization may be performed only for the collaboration application such that the collaboration application maintains a clock feature for the participating devices for the duration of the collaboration between the participating devices.

Conventional synchronization of a device may rely upon communication between the device and a network entity, such as a time server, which requires a connection to the network entity (e.g., via communications interface 74) and requires traversal time of messages to and from the network entity to establish a time or synchronization. Such a synchronization process may need to compensate for varying network latency and the speed and accuracy of synchronization may depend upon network characteristics and connectivity of the participating devices.

Example embodiments of the present invention may provide a mechanism for establishing synchronization of devices participating in a collaboration application without requiring communication between a device and a network entity, such as a time server. Further, example embodiments may provide a mechanism for establishing synchronization of participating devices without requiring a synchronization signal or clock signal to be sent or exchanged between devices participating in a collaboration application.

In an example embodiment of the present invention, a user may initiate a collaborative application on a first device, such as mobile device 10, and join other devices to the collaboration. The other device or devices to participate in the collaboration application may send or receive a request to join the collaboration. The request may be sent or received through near-field or far-field communications protocols. A user may initiate the collaborative application also on the other device so that both devices are ready for the collaboration. Upon initiation of the collaboration application, the collaboration application may require or benefit from synchronization of participating devices. The participating devices may be "bumped" together to establish synchronization. The "bump" may be a physical contact between the devices resulting in an acceleration change (seen at sensor 84, for example) that is greater than the acceleration typically experienced by the device. The bumping of the devices may be requested, required, or suggested by the collaboration application (e.g., via user interface 72). Optionally, experienced users may understand that synchronization is desirable for certain collaboration applications and may perform the synchronization without a request.

Figure 3:
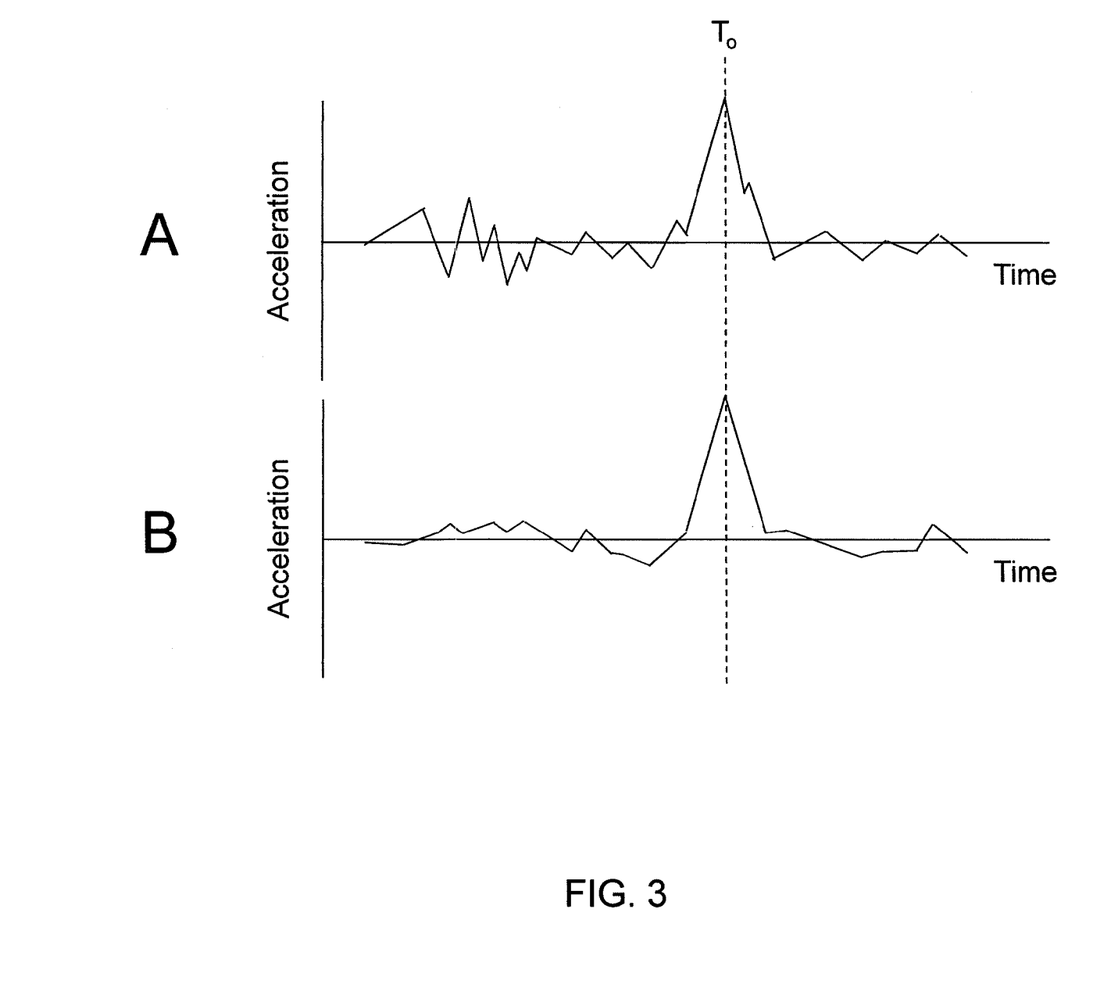
FIG. 3 is a plot of a signal as received from a sensor of device A and a signal as received from a sensor of device B for synchronization.

The bumping of devices together may establish a synchronization event between the devices which were bumped. In an example embodiment, an accelerometer, such as sensor 84, may sense the bump through a change in acceleration and establish a synchronization point or a reference time in response to receiving the bump. FIG. 3 illustrates an example embodiment of the signals received from the accelerometers of device "A" and device "B." As illustrated, the accelerometers for each device experience a bump at the same time, established as reference time $T_o$ as the synchronization point between device "A" and device "B." This synchronization point $T_o$ may then be the reference time used by the collaboration application to ensure that device "A" and device "B" are synchronized for the duration of the collaboration application. While some example embodiment disclosed herein recite examples using accelerometers, other sensors may be used, such as a gyroscopic sensor, a magnetic field sensor, or any type of sensor that may detect a positional change in a device. Additionally or alternatively, a microphone may be used to detect the sound of the two devices bumping against each other.

The reference time $T_o$ may be determined from the signal from the accelerometer through a number of methods including establishing the maximum value, a maximum derivative, and/or a threshold. In the maximum value method of establishing the reference time, the "bump" may be determined based upon the highest acceleration seen during the sampling period of the accelerometer. The highest acceleration may be measured from the absolute value of the acceleration experienced at the accelerometer to negate orientation or direction of the acceleration. In the maximum derivative method, the derivative of the wave forms of the accelerometer signal may be calculated to establish the maximum value of the derivative, which is determined to be the "bump" to synchronize the devices at reference time $T_o$. For the threshold method, a predefined threshold of acceleration value may be used such that an acceleration value exceeding the threshold is determined to be a "bump" for synchronization. The threshold value of acceleration would be experienced by both devices during a bump at the same time, thus establishing a reference time $T_o$.

Another method of establishing a reference time for synchronization may include a correlation method. In a correlation method, a first device may be bumped with a second device, where the first device is the primary device or the device that has initiated the collaborative application. In such an embodiment, the second device may send the accelerometer data from the second device to the first device, where the accelerometer data generated from the accelerometer signal may be acceleration measured against a time line that is generated by the clock of the second device. The first device may then compare the accelerometer data of the first device with the accelerometer data of the second device to establish an offset that is determined to be present between the clocks of the first device and the second device. The first device may then apply that offset to any time-stamped data or information that is received from, or transmitted to the second device, maintaining synchronization between the first device and the second device.

Figure 4:
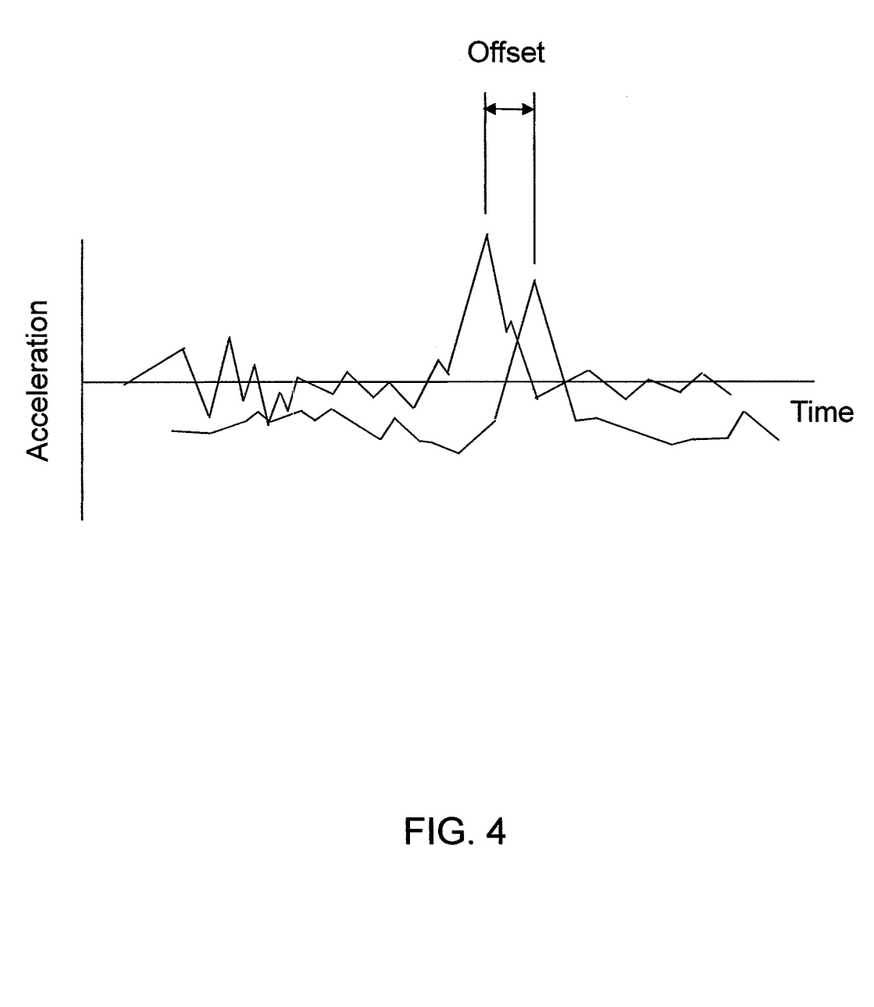
FIG. 4 is a plot of a signal as received from a sensor of device A and a signal as received from a sensor of device B for synchronization as using a correlation method.

FIG. 4 illustrates an example embodiment of the correlation method in which the acceleration data from two devices is shown on a timeline that may be the time-of-day as determined by each device (e.g., by processor 70). As the "bump" between the devices occurred simultaneously, the difference between the determined bump (e.g., through the maximum acceleration value method) is determined to be the offset between the time-of-day clocks of each of the devices. This offset may be used for transmitting and receiving data such that the devices are kept in synchronization during use of the collaboration application.

Figure 5:
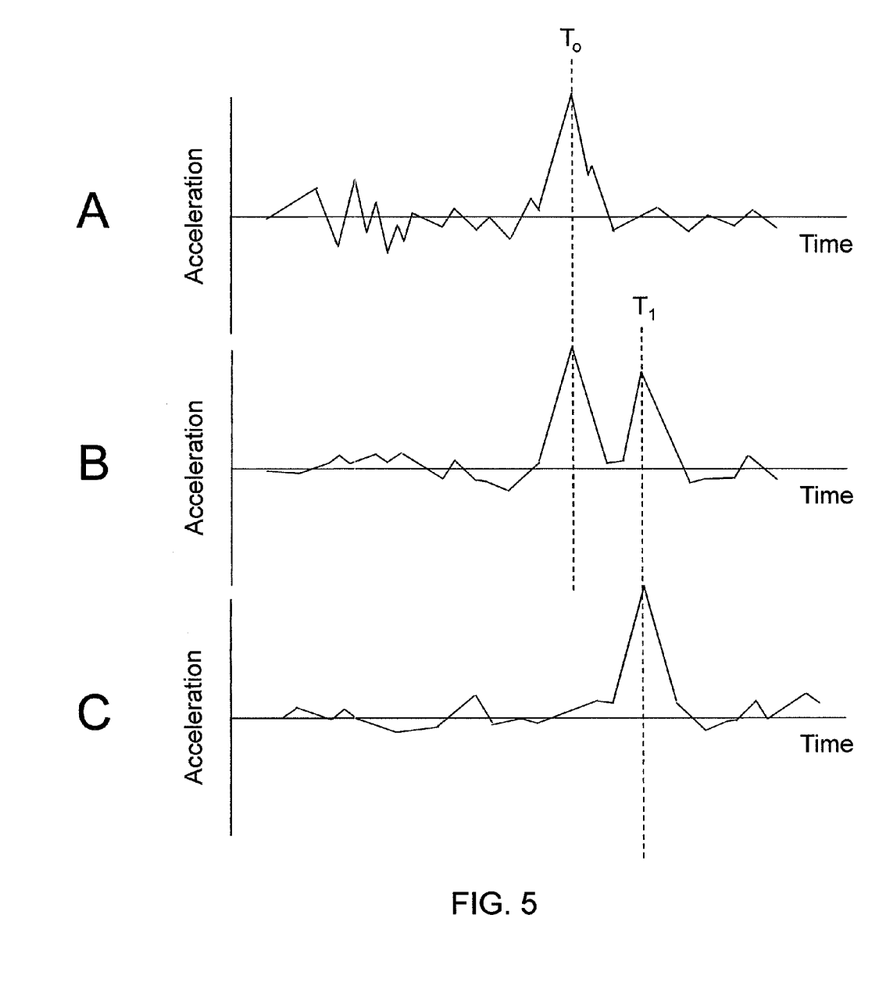
FIG. 5 is a plot of a signal as received from a sensor of device A, a signal as received from a sensor of device B, and a signal as received from a sensor of device C for synchronization.

Additional devices may also be synchronized with devices that have already been synchronized together through any one of the aforementioned methods. For example, with reference to the example embodiment illustrated in FIG. 5, if a third device (e.g., device "C") is to join the collaboration application, it may be bumped with either device "A" or device "B." As both device "A" and device "B" are synchronized, the device with which device "C" is bumped can now be synchronized. For example, if device "C" is bumped with device "B", another reference time $T_1$ may be established. In an example embodiment, the offset between $T_1$ and $T_0$ may be communicated between device "B" and device "C" such that device "C" can recognize $T_0$ as the original synchronization point and devices "A," "B," and "C" can collaborate as synchronized devices. Optionally, without communication of an offset, device "A" may be synchronized with device "B" at reference time $T_0$ while device "B" may be synchronized with device "C" at reference time $T_1$, such that collaboration between device "A" and device "C" is established and maintained through device "B" which recognizes any offset between $T_0$ and $T_1$, thus maintaining synchronization between device "B" and device "C."

The sensors (e.g., sensor 84) used to establish synchronization between devices for a collaboration application may be configured to be sampled over a period of time in which a synchronizing bump is expected to occur. There are several methods to configure the timing and duration of the sampling phase such as by time interval, bump detection, and user-guided.

The time interval sampling period method may provide a limited-duration time window in which a bump is expected to occur. The time interval may be set by a user or pre-defined by a collaboration application. The time interval may be, for example, around two seconds and the time interval may begin upon the start of a collaboration application on a device. For example, a first device may initiate a collaboration application and join another device to the collaboration application through a request via near-field or far-field communication protocols (e.g., via communications interface 74). A user can also initiate the collaborative application on both devices. Upon receiving the request or accepting the request at the second device, the second device may begin a time interval in which a synchronization bump is expected to occur. The sensor for detecting the bump, such as an accelerometer, may be sampled during this time interval. If a bump is not recognized during the time interval, the collaboration application may proceed without synchronization if possible, otherwise the time interval may restart or a user may be prompted for a synchronizing bump.

The bump detection sampling period method may provide a sampling period that begins upon the initiation of a collaboration application and only ends after a bump is detected. The bump detection sampling period may be desirable for collaboration applications that require synchronization between participating devices to properly function. Optionally, the bump detection sampling period may begin in response to a user input indicating that a synchronizing bump is anticipated.

A user-guided sampling period for detecting a synchronizing bump may be initiated manually by a user, for example, by pressing an input to begin a synchronizing function. The user may be required to depress an input throughout the synchronization, or the synchronization may end when instructed by a user. Optionally, the user may instruct initiation of the sampling period and it may end upon detection of a bump or when the sampling period times-out after a predetermined amount of time.

Upon synchronizing multiple devices together for use of a collaboration application, the collaboration application may function more efficiently and accurately. For example, in an embodiment in which the collaboration application is a multimedia playback application, two collaborating devices may each play back one or more channels of a multiple-channel multimedia file, such as the right and left channels of a stereo audio file. Synchronizing the devices may prevent or reduce the likelihood of the left and right channels being out of phase.

In some example embodiments, synchronization of devices participating in a collaboration application may be performed before, during, or after the collaboration application session. For example, a collaboration application in which two devices are collaborating to capture audio and video data of a common event, the bump and the synchronization can be performed separately at any point before, during, or after the capturing of the audio and video data. In the embodiments described above, the bump and the synchronization may be performed at the initiation of the collaboration application such that the participating devices are synchronized during the data capture. However, if the captured data is intended for playback or other manipulation at a later time, the synchronization between participating devices may be performed at any point.

Figure 6:
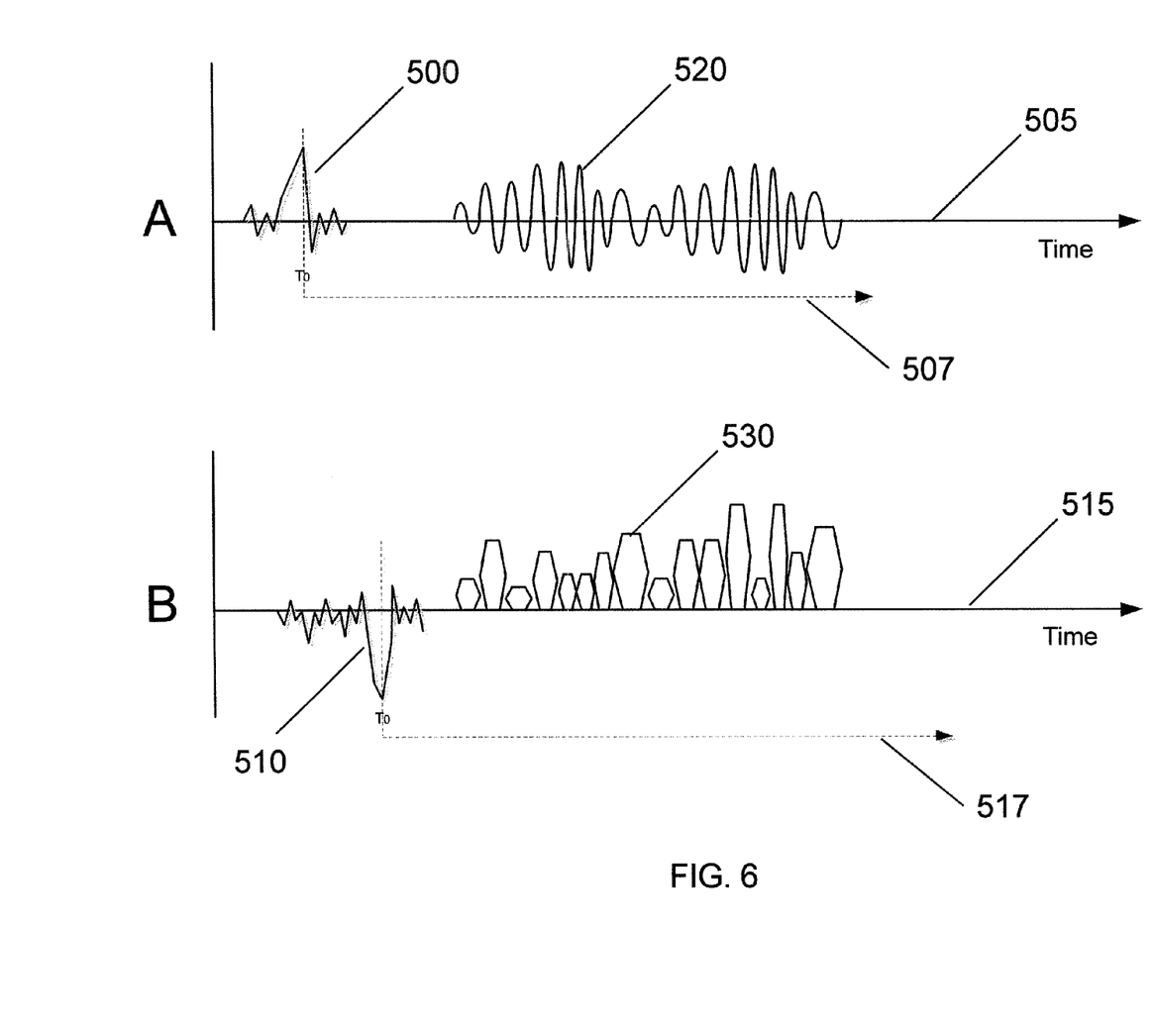
FIG. 6 illustrates a plot of a signal as received from a sensor of device A and a signal as received from a sensor of device B for synchronization.

FIG. 6 illustrates an example embodiment in which device A is capturing audio data 520 and device B is capturing video data 530, each along their respective internal clock time line 505 and 515. In the example embodiment, the accelerometer data is received by device A at 500 and by device B at 510. The detected bump establishes a reference time $T_o$, at which point the data captured by each respective device will be synchronized. The synchronization can occur before, during, or after the data capture as the point from which the devices will be synchronized has been established at $T_o$. Additionally, the reference time $T_o$ can be established during the data capture such that the collected data may be synchronized at any point after the establishment of the reference time. The synchronization between devices in such an embodiment may be performed at a network entity, such as at a server, or at one of the participating devices. Once synchronized, the data from each participating device is aligned at reference time $T_o$ such that the data is aligned along timelines 507 and 517 respectively.

Example embodiments of the present invention provide an improvement over existing time synchronization techniques by not requiring communication external of the device, such as wireless communication. Multiple devices may by synchronized for a collaboration application without communicating with a network entity, and in some embodiments, without communicating with each other regarding a reference time for synchronization. Thus, embodiments of the present invention may provide more accurate and repeatable synchronization of devices while reducing or eliminating network latency and network communication. Further, synchronization between devices may be accomplished while neither device has a reliable network connection. Embodiments of the present invention may be used in places where a wireless signal is not available or not permitted, such as on an airplane in flight.

Figure 7:
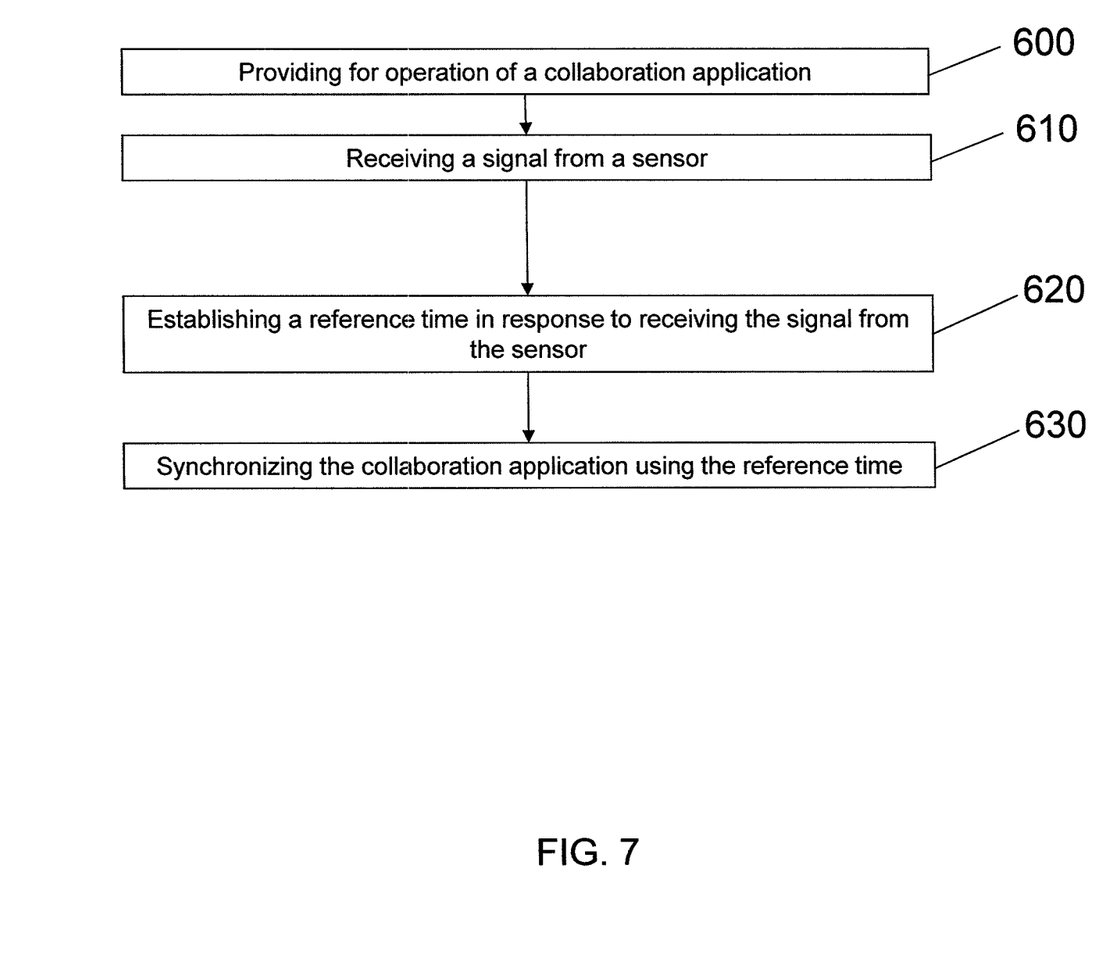
FIG. 7 is a flowchart of the operations performed to provide synchronization between devices for a collaboration application according to an example embodiment of the present invention.

FIG. 7 is a flowchart of a method and program products according to example embodiments of the invention. It will be understood that each block of the flowchart, and combinations of blocks in the flowchart, may be implemented by various means, such as hardware, firmware, processor, circuitry and/or other device associated with execution of software including one or more computer program instructions. For example, one or more of the procedures described above may be embodied by computer program instructions. In this regard, the computer program instructions which embody the procedures described above may be stored by a memory device of a user device and executed by a processor in the user device. As will be appreciated, any such computer program instructions may be loaded onto a computer or other programmable apparatus (e.g., hardware) to produce a machine, such that the instructions which execute on the computer or other programmable apparatus create means for implementing the functions specified in the flowchart block(s). These computer program instructions may also be stored in a non-transitory computer-readable memory that may direct a computer or other programmable apparatus to function in a particular manner, such that the instructions stored in the computer-readable memory produce an article of manufacture which implements the functions specified in the flowchart block(s). The computer program instructions may also be loaded onto a computer or other programmable apparatus to cause a series of operations to be performed on the computer or other programmable apparatus to produce a computer-implemented process such that the instructions which execute on the computer or other programmable apparatus implement the functions specified in the flowchart block(s).

Accordingly, blocks of the flowchart support combinations of means for performing the specified functions and combinations of operations for performing the specified functions. It will also be understood that one or more blocks of the flowchart, and combinations of blocks in the flowchart, can be implemented by special purpose hardware-based computer systems which perform the specified functions, or combinations of special purpose hardware and computer instructions.

In this regard, a method according to one embodiment of the invention, as shown in FIG. 7, may include providing for operation of a collaboration application at 600, receiving a signal from a sensor at 610, establishing a reference time in response to receiving the signal from the sensor at 620, and synchronizing the collaboration application using the reference time at 630.

In some embodiments, certain ones of the operations above may be modified or further amplified as described below. Moreover, in some embodiments additional optional operations may also be included. It should be appreciated that each of the modifications, optional additions or amplifications below may be included with the operations above either alone or in combination with any others among the features described herein. In some embodiments, the sensor may be an accelerometer and the signal may include a sampling of information from the sensor. The sampling may be conducted during a time interval, or possibly until a bump is detected. Establishing the reference time may include detecting a maximum value of the signal and/or detecting the signal exceeding a pre-defined threshold. In some embodiments, establishing the reference time may not require wireless communication.

In an example embodiment, an apparatus for performing the method of FIG. 7 above may comprise a processor (e.g., the processor 70) configured to perform some or each of the operations (600-630) described above. The processor 70 may, for example, be configured to perform the operations (600-630) by performing hardware implemented logical functions, executing stored instructions, or executing algorithms for performing each of the operations. Alternatively, the apparatus may comprise means for performing each of the operations described above. In this regard, according to an example embodiment, examples of means for performing operations 600-630 may comprise, for example, the apparatus 50 (or respective different components thereof). Additionally or alternatively, at least by virtue of the fact that the processor 70 may be configured to control or even be embodied as apparatus 50, the processor 70 and/or a device or circuitry for executing instructions or executing an algorithm for processing information as described above may also form example means for performing operations 600-630.

An example of an apparatus according to an example embodiment may include at least one processor and at least one memory including computer program code. The at least one memory and the computer program code may be configured to, with the at least one processor, cause the apparatus to perform the operations 600-630 (with or without the modifications and amplifications described above in any combination).

An example of a computer program product according to an example embodiment may include at least one computer-readable storage medium having computer-executable program code portions stored therein. The computer-executable program code portions may include program code instructions for performing operation 600-630 (with or without the modifications and amplifications described above in any combination).

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe some example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A method comprising:
   providing for operation of a collaboration application on a first device and a second device, wherein the collaboration application comprises at least one of a computationally intensive application configured to distribute computational requirements among collaborating devices, or a game wherein each collaborating device corresponds to a player in the game;
   receiving at the first device a signal from a sensor, wherein the sensor comprises a sensor to detect movement of the first device;
   establishing a reference time in response to receiving the signal from the sensor, wherein the signal is indicative of a movement of the first device; and
   synchronizing the collaboration application between the first device and the second device using the reference time, wherein synchronizing the collaboration application between the first device and the second device comprises synchronizing a clock within the first device and the second device.

2. The method of claim 1, wherein the sensor is an accelerometer.

3. The method of claim 1, wherein the signal comprises a sampling of information from the sensor.

4. The method of claim 3, wherein the sampling is conducted during a time interval.

5. The method of claim 1, wherein establishing the reference time comprises establishing the reference time at a maximum detected value of the signal.

6. The method of claim 1, wherein establishing the reference time comprises detecting the signal exceeding a pre-defined threshold.

7. The method of claim 1, wherein establishing the reference time does not require wireless communication.

8. An apparatus comprising at least one processor and at least one memory including computer program code, the at least one memory and the computer program code configured to, with the processor, cause the apparatus to at least:
   provide for operation of a collaboration application on a first device, wherein the collaboration application is operating on a second device, wherein the collaboration application comprises at least one of a computationally intensive application configured to distribute computational requirements among collaborating devices, or a game wherein each collaborating device corresponds to a player in the game;

receive a signal from a sensor, wherein the sensor comprises a sensor to detect movement of the first device;

establish a reference time in response to receiving the signal from the sensor, wherein the signal is indicative of a movement of the first device; and synchronize the collaboration application between the first device and the second device using the reference time, wherein synchronizing the collaboration application between the first device and the second device comprises synchronizing a clock within the first device and the second device.

9. The apparatus of claim 8, wherein the sensor is an accelerometer.

10. The apparatus of claim 8, wherein the signal comprises a sampling of information from the sensor.

11. The apparatus of claim 10, wherein the sampling is conducted during a time interval.

12. The apparatus of claim 8, wherein establishing the reference time comprises establishing the reference time at a maximum detected value of the signal.

13. The apparatus of claim 8, wherein establishing the reference time comprises detecting the signal exceeding a pre-defined threshold.

14. The apparatus of claim 8, wherein establishing the reference time does not require wireless communication.

15. A computer program product comprising at least one non-transitory computer-readable storage medium having computer-executable program code instructions stored therein, the computer-executable program code instructions comprising:

program code instructions to provide for operation of a collaboration application on a first device and a second device, wherein the collaboration application comprises at least one of a computationally intensive application configured to distribute computational requirements among collaborating devices, or a game wherein each collaborating device corresponds to a player in the game;

program code instructions to receive at the first device a signal from a sensor, wherein the sensor comprises a sensor to detect movement of the first device;

program code instructions to establish a reference time in response to receiving the signal from the sensor, wherein the signal is indicative of a movement of the first device; and program code instructions to synchronize the collaboration application between the first device and the second device using the reference time, wherein synchronizing the collaboration application between the first device and the second device comprises synchronizing a clock within the first device and the second device.

16. The computer program product of claim 15, wherein the sensor is an accelerometer.

17. The computer program product of claim 15, wherein the signal comprises a sampling of information from the sensor.

18. The computer program product of claim 17, wherein the sampling is conducted during a time interval.

19. The computer program product of claim 15, wherein the program code instructions for establishing the reference time comprises program code instructions for establishing the reference time at a maximum detected value of the signal.

20. The computer program product of claim 15, wherein the program code instructions for establishing the reference time comprises program code instructions for detecting the signal exceeding a pre-defined threshold.

\* \* \* \* \*